Jan. 3, 1967  F. J. HAYNES  3,295,480
APPARATUS FOR DISTRIBUTING CHEMICALS BENEATH THE
SURFACE OF THE EARTH
Filed May 12, 1965  2 Sheets-Sheet 1

INVENTOR.
FREDDIE J. HAYNES
BY
*Dunlap & Haney*
ATTORNEYS

Jan. 3, 1967 F. J. HAYNES 3,295,480
APPARATUS FOR DISTRIBUTING CHEMICALS BENEATH THE
SURFACE OF THE EARTH
Filed May 12, 1965 2 Sheets-Sheet 2
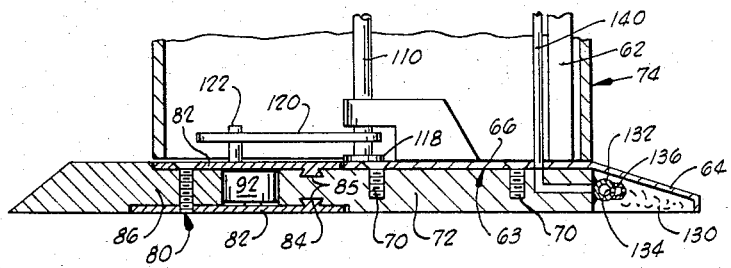
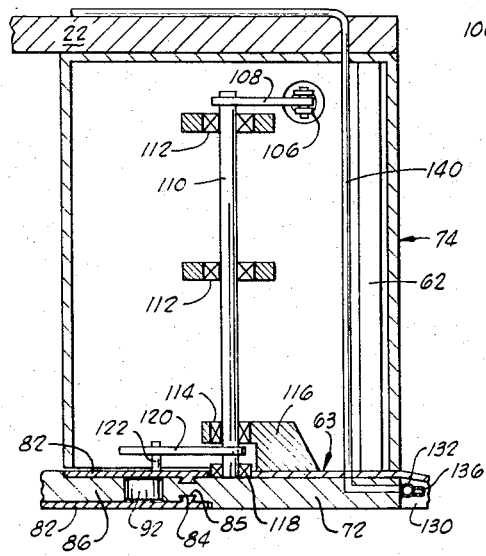
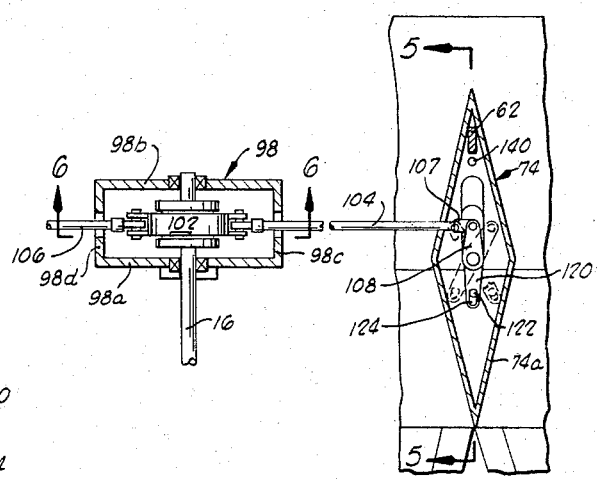
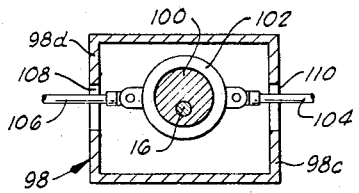
INVENTOR.
FREDDIE J. HAYNES
BY
Dunlap & Laney
ATTORNEYS United States Patent Office 3,295,480
Patented Jan. 3, 1967

3,295,480
APPARATUS FOR DISTRIBUTING CHEMICALS BENEATH THE SURFACE OF THE EARTH
Freddie J. Haynes, 917 W. Silver Meadow, Midwest City, Okla. 73110
Filed May 12, 1965, Ser. No. 455,193
19 Claims. (Cl. 111—6)

This invention relates to a method and apparatus for evenly depositing chemicals, such as fertilizers, bacteriocides and fungicides, at a selected depth below the surface of the earth. More particularly, but not by way of limitation, the present invention relates to a machine for slicing away the upper surface of the earth in a manner which disturbs the earth to a minimum degree, then inserts or injects a chemical substance into the space defined between the removed layer of earth and the underlying earth, and finally replaces the removed layer of earth in substantially its former position so as to cover the disseminated chemical and seal it beneath the replaced layer.

A considerable problem has heretofore existed of depositing beneath the surface of the earth in a uniform manner, a chemical which functions to directly promote the growth of certain crops or plant life, or which functions to provide a better soil environment in which such growth can occur. Various types of drills and vertically extending pipes or probes have been used for injecting gaseous and liquid chemicals into the earth, with such probes being space horizontally from each other during the injection. An undesirable characteristic of all such machines which have heretofore been developed is their inability to uniformly distribute the chemicals in the earth so that uniform growth can be expected from plants which are later seeded or planted in the earth so treated. In some instances, the chemical has been too greatly concentrated in a specific area with the result that, in some cases, the young plants are burned or their root systems are destroyed. In other cases, the concentration of the chemical in one location has resulted in a scarcity of the chemical in another location so that a less than optimum supply of the chemical is provided for plants in the latter location.

The present invention provides improved apparatus for distributing chemicals beneath the surface of the earth, and it is believed that the principle employed in the apparatus of the present invention is novel and constitutes a new approach to the problem of even sub-surface distribution. Broadly described, the present invention comprises a frame having horizontally spaced, vertically extending side plates; generally horizontally extending dirt supporting means extending between the side plates and defining with the side plates a downwardly opening chemical distribution chamber; chemical distribution means extending across the chemical distribution chamber and including means for evenly ejecting a chemical into all parts of the chemical distribution chamber; a chemical reservoir mounted on the frame and connected to said chemical distribution means for supplying a chemical thereto; and earth cutting means mounted on said frame for cutting movement in a horizontal plane, said earth cutting means extending between said side plates and being positioned adjacent, and at a slightly lower level than, said horizontally extending dirt supporting means; and power means for moving said framework along the ground and for simultaneously driving said earth cutting means in a cutting movement to slice through the earth in a substantially horizontal plane below the surface thereof.

The earth cutting means and the dirt supporting means are constructed and arranged relative to each other so that a layer of earth sheared or cut away by the earth cutting means is caused to move rearwardly as the frame carrying the earth cutting means and dirt supporting means is moved forwardly by the power means. The severed layer of earth passes backwardly over the dirt supporting means which, in a preferred embodiment of the invention, constitutes a bar or plate having a relatively flat surface and tapering downwardly at its side most distally removed from the earth cutting means. Located below this plate is the downwardly opening chemical distirbution chamber, and as the dirt passes to the rear of the framework over the dirt supporting plate, a chemical, such as a fertilizer, is evenly distributed within the chamber and is immediately covered by the layer of earth as it passes off of the dirt supporting plate to the rear of the frame. The described apparatus is particularly effective when a gaseous or liquid chemical is to be deposited beneath the earth since, in either form, the chemical can be caused to diffuse throughout the entire volume of the distribution chamber and contact the earth at every point where the upper layer thereof has been sliced away by the earth cutting means.

In a specific and preferred, though non-limiting, embodiment of the invention, the apparatus employed comprises a framework having a front and rear and including two substantially parallel, vertically extending, spaced side plates. Extending between the two side plates is a dirt supporting plate which is characterized in having a leading edge positioned toward the front end of the frame and a trailing edge positioned toward the rear end of the frame with the dirt supporting plate extending between and secured to the side plates. The dirt supporting plate has a thickened forward portion and a rear portion which is thinner than the forward portion and is spaced above the lower edges of the side plates so as to define therewith a downwardly opening chamber. The rear portion of the dirt supporting plate is inclined downwardly from its junction with the forward portion thereof to the trailing edge of the dirt supporting plate, with this trailing edge lying substantially in the plane of the two lower edges of the vertically extending side plates of the machine. An elongated chemical distribution pipe extends between the side plates beneath the dirt supporting plate and within the downwardly opening chamber. The chemical distribution pipe has a plurality of horizontally spaced orifices formed therein for distributing a chemical into all parts of the downwardly opening chamber. A chemical storage tank or chamber is mounted on the frame and is connected to the chemical distribution pipe for conveying to the distribution pipe, a selected chemical which it is desired to distribute evenly at a selected depth beneath the surface of the earth.

The apparatus can further include a self-powered vehicle, such as a tractor, connected to the framework for moving the framework along the ground, and power transmission means connected between the self-powered vehicle and the earth cutting blade or blades mounted on the framework for driving these blades in a cutting motion, and in a horizontal plane so that they effectively slice into the ground as the frame and the various structures carried thereby are moved forwardly by the self-powered vehicle. The earth cutting blade or blades which are employed can be made to move either transversely, that is, substantially normal, with respect to the direction of travel of the self-powered vehicle and the frame, or the blades may be caused to reciprocate in the direction of travel, or a compound motion may be imparted to the blades in which components of both horizontal, or lateral, travel and forward travel are combined. In a preferred embodiment of the invention, a single bladed structure having a plurality of cutting edges or teeth thereon is utilized and is caused to reciprocate transversely of the path of travel of the apparatus. This motion of the bladed structure has been found to be especially well adapted for severing roots which may extend to a considerable depth beneath the soil.

Various types of transmissions may be utilized to impart a driving force to the blade or blades, with such transmissions preferably being operated from a power takeoff provided on the self-propelled vehicle. An independent source of power is, however, contemplated by the invention and may be located on the framework which carries the earth cutting blade.

In operation, a layer of earth severed by the cutting blade or blades is moved rearwardly from the blade onto the earth supporting plate and then moves rearwardly on the plate until it passes over the chemical distribution chamber. The severed layer of earth is then returned smoothly and evenly to the position from which it is removed and, in such return, covers the evenly distributed chemical which has been discharged into the chemical distribution chamber and has, to some extent, impregnated the earth lying beneath the layer of the earth which has been removed by the action of the cutting blade. The downwardly opening chamber which is provided for receiving the chemical from the chemical distribution pipe is enclosed on all sides by earth during the operation of the device so that there is no opportunity for the chemical, which may, in some instances, be noxious, or at least deleterious to surrounding animal and plant life, to escape from the chamber to the surrounding atmosphere.

From the foregoing description of the invention, it will have become apparent that it is a major object of the invention to provide an improved apparatus for evenly and selectively distributing a chemical at a desired depth beneath the surface of the earth.

A further object of the invention is to provide a device for injecting and evenly distributing a chemical beneath the surface of the earth while simultaneously pulverizing the earth when such action is desired.

A further object of the invention is to provide apparatus which can effectively distribute a gaseous chemical beneath the surface of the earth without permitting some of the chemical to escape to the surrounding atmosphere and thus cause a safety hazard to surrounding plant and animal life.

An additional object of the present invention is to provide an earth moving apparatus which can quickly and effectively slice through the earth in a horizontal plane spaced downwardly from the surface thereof, regardless of the type of soil encountered, or the presence in the earth of substantial and advanced root growth.

In addition to the foregoing objects and advantages, other objects and advantages will become apparent as the following detailed description of the invention is read in conjunction with the accompanying drawings which illustrate the invention.

In the drawings:

FIGURE 3 is a vertical sectional view taken through a portion of the chemical distribution apparatus and illustrating details of the power transmission structure and the blade assembly.

FIGURE 4 is a partial sectional view of a detail in the structural arrangement of the apparatus of the invention showing parts of the power transmission utilized for driving the cutting blades employed in the invention.

FIGURE 5 is a sectional view taken along line 5—5 of FIGURE 4.

FIGURE 6 is a sectional view taken along line 6—6 of FIGURE 4.

Figure 1:
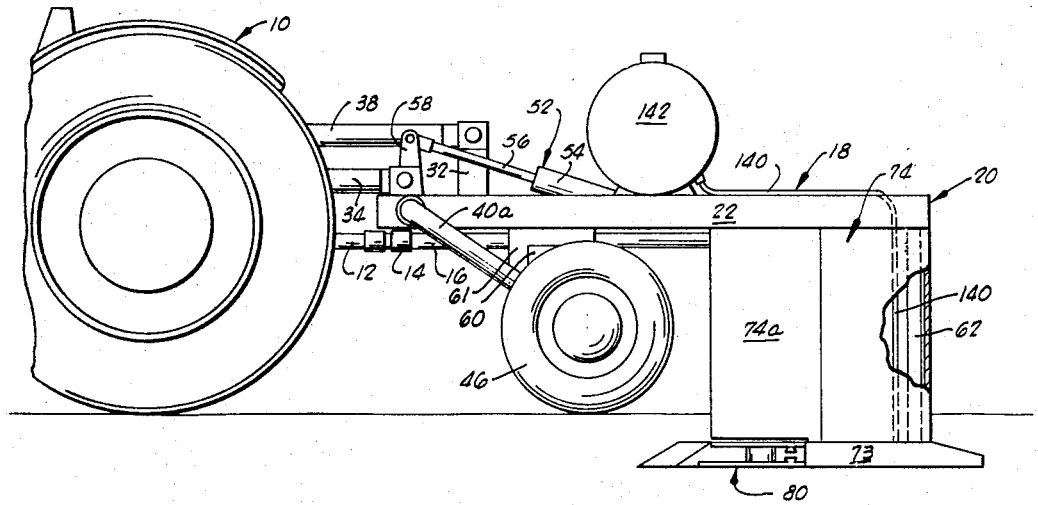
FIGURE 1 is an elevational view depicting the chemical distributing apparatus of the present invention as the same appears when connected to a tractor vehicle in operative position. The earth cutting means of the apparatus is shown in the position it occupies as it slices through the earth in removing a surface layer thereof.

Referring now to the drawings in detail, and particularly, to FIGURE 1, the rear end of a self-propelled vehicle, such as a farm tractor, is designated generally by reference character 10. The tractor 10 is provided with the usual power takeoff shaft 12 which is connected through a suitable coupling 14 to a drive shaft 16 positioned on a chemical distribution apparatus constructed in accordance with the present invention, and designated generally by reference character 18. The chemical distribution apparatus 18 includes a framework 20 having horizontally extending, spaced side frame members 22. The side frame members 22 are interconnected by a forward frame member 24 and a rear frame member 26.

Extending upwardly from the forward end of each of the side frame members 22 are a pair of hitch brackets 28. A transverse brace 30 extends parallel to the forward frame member 24 and is spaced rearwardly therefrom and secured at its ends to the side frame members 22. The transverse brace 30 carries a pair of vertically extending hitch brackets 32.

The lateral hitch brackets 28 carried on the side frame members 22 form points of connection for a pair of hitch links 34 which extend forwardly from the chemical distribution apparatus 18 and are connected at their forward ends to lift mechanism (not visible) on the tractor 10 which permits the chemical distribution apparatus to be lifted vertically upwardly, as hereinafter described.

The central hitch brackets 32 are secured by means of a suitable pin 36 to one end of a central hitch link 38. The other end of the central hitch link 38 is connected to suitable actuating means (not visible) on the tractor 10 to permit the hitch link 38 to be extended or retracted. This motion of the central hitch link 38 permits the framework 20 of the chemical distribution apparatus 18 to be pivoted about a horizontal axis so as to be inclined with respect to the surface of the earth. The function of the hitch links 34 and 38 will be hereinafter explained in greater detail.

An elongated shaft 40 is extended through and journaled in the side frame members 22 adjacent their forward ends and includes rearwardly bent portions 40a and 40b which carry at their ends a pair of outwardly bent axle portions 42 and 44, respectively. A pair of ground engaging wheels 46 and 48 are mounted on the axle portions 42 and 44 of the elongated shafts 40 so that as the shaft 40 is rotated about its pivotal axis in the bearings provided in the side frame members 22, the wheels are raised and lowered. In order to raise and lower the wheels 46 and 48, a hydraulic piston and cylinder arrangement designated generally by reference character 52 is mounted on the framework 20 and includes a fixed cylinder 54 and a movable piston 56 which is secured at its free end outside the cylinder 54 to a pivot arm 58 which is secured by welding, or other suitable means, to the shaft 40 between the side frame members 22. Extension of the piston 56 from the cylinder 54 thus causes the ground engaging wheels 46 and 48 to be pivoted upwardly to a selected position where they can be locked in place by means of a latching pin 59 which engages holes provided in a plate 60 secured to the rearwardly bent portion 40a of the shaft 40 and in a plate 61 secured to the side frame member 22.

When the ground engaging wheels 46 and 48 are to be lowered, the hydraulic piston is retracted or merely is deenergized so that the fluid can be bled therefrom, and the ground engaged wheels permitted to descend in pivotation about their horizontal axis under the influence of gravity. The pin and plate combination permits locking of the wheels in any desired position. The manner in which the ground engaging wheels 46 and 48 are adjusted to establish the depth at which the cutting blade or blades of the chemical distribution apparatus move in the earth will be hereinafter described in greater detail.

Extending downwardly from the rear portion of the frame 18 are a pair of horizontally spaced, vertically extending stanchions 62. The stanchions 62 are secured at their lower ends to a horizontally extending dirt supporting plate 63, best illustrated in FIGURES 2 and 3. The dirt supporting plate 63 is provided with a relatively flat, upper surface and has a downwardly inclined rear portion 64 and a horizontal forward portion 66, as illustrated in FIGURE 3. The horizontal forward portion 66 of the earth supporting plate is secured by suitable screws or bolts 70 to a main transverse support plate 72 which is a relatively thick structure extending transversely across the chemical distribution apparatus in a direction parallel to the axis of rotation of the ground engaging wheels 46 and 48. On each side of the chemical distribution apparatus 18, a pair of vertically extending side plates 73 are secured to the lateral ends of the main transverse support plate.

A pair of vertically extending, horizontally spaced transmission housings 74 extend between and are secured to the framework 18 and to the dirt supporting plate 63, and are anchored or secured at their rearmost sides to the vertically extending stanchion 62. The housing is preferably welded or otherwise suitably secured around its lower edge to the forward portion 66 of the earth supporting plate 63 with which it is in contact, and is secured at its upper end by bolting or welding to the side frame members 22 adjacent the rear ends thereof.

The transmission housings 74 in the illustrated embodiment of the invention are generally diamond-shaped in horizontal cross-sectional configuration, and include a leading portion 74a which is formed by two sides which converge and meet at a vertically extending line of junction. This structure functions to divide or split the dirt passing back over the dirt supporting plate with a minimum of resistance, as will be hereinafter described.

Figure 2:
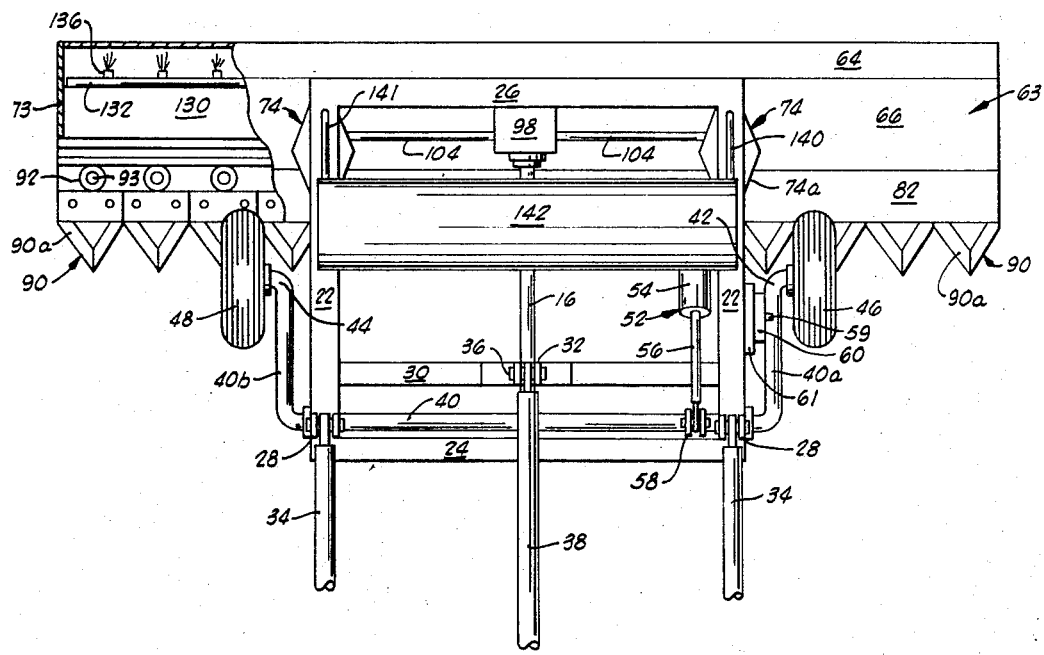
FIGURE 2 is a plan view of the apparatus illustrated in FIGURE 1 with a portion of the dirt supporting plate which covers the chemical distribution chamber broken away to show the relationship of certain structural elements of the invention.

The leading portions 74a of the transmission housings 74 extend forwardly over a reciprocating blade structure designated generally by reference character 80. The reciprocating blade structure 80 includes a pair of vertically spaced, horizontally extending slide plates 82 having a pair of trapezoidally cross-sectioned elongated keying sections 84 formed on the opposed surfaces thereof and engaging slotted keyways 85 formed in the main transverse support plates 72. The horizontally extending slide plates 82 are bolted or otherwise suitably secured to the shank portions 86 of a plurality of triangular cutter blades 90. The cutter blades 90 are provided with tapered, sharpened leading edges 90a. The cutting teeth 90 are disposed in juxtaposition to each other over the transverse extent of the blade assembly 80, as best illustrated in FIGURE 2.

Positioned to the rear of the shanks 86 of cutter blades 90, and interposed between the two horizontally extending slide plates 82 are a plurality of rotatably mounted roller bearings 92. The roller bearings 92 are rotatably supported on shafts 93 which extend between the horizontal plates 82 and are positioned to bear against and roll upon the forward or leading edge of the main transverse support plate 72. A plurality of the roller bearings 92 are provided at horizontally spaced intervals along the blade assembly 80 and over the entire transverse extent of the chemical distribution apparatus 18.

From the description thus far, it will be perceived that the blade assembly 80 is mounted on the main transverse support plate 72 for transverse reciprocating movement therealong with the main functional wear being taken by the roller bearings 92 and the keying projections 84 on the horizontal plates 82. It should be pointed out that the forward or leading portion of the main transverse support plate 72 is flame hardened so as to be able to sustain the frictional wear imposed thereon during operation of the device and, because of this treatment, the main transverse support plate 72 is characterized by a longer effective service life than is characteristic of the cutter blades 90 mounted between the horizontal plates 82.

For the purpose of driving the blade assembly 80 in transverse reciprocating movement, the power input shaft 16 connected to the power takeoff 12 through the coupling 14 is passed into a cam housing 98 which is secured to and supported by the rear frame member 26. The cam housing 98 is best illustrated in FIGURES 2, 4 and 6 includes a front wall 98a, a rear wall 98b and a pair of side walls 98c and 98d. The power input shaft 16 has keyed thereto within the cam housing 98 an eccentrically mounted cam plate 100. The cam plate 100 thus rotates with the power input shaft 16, and is utilized to convert the rotational movement of the shaft 16 to oscillating motion by means of an annular bearing plate 102 which surrounds the cam plate 100 and is mounted for rotational movement thereon. Thus, as the shaft 16 is rotated, the cam plate 100 is caused to move eccentrically about the axis of rotation and such eccentric motion is transmitted to the annular bearing plate 102. The plate 102 is fixed against rotational movement by attachment to a pair of transversely extending connecting rods 104 which extend through openings provided in the side walls 98c and 98d in the cam housing 98.

The opposite ends of the connecting rods 104 are each pivotally connected to one end of a crank link 107 (as best illustrated in FIGURE 4) disposed inside the transmission housings 74. The opposite ends of each of the crank links 107 are each rigidly attached to a crank arm 108 which is keyed to the upper end of a shaft 110. The shafts 110 extend downwardly in each of the transmission housings 74 through a plurality of journals 112 mounted in the transmission housings, and extend through a bearing 114 carried by a rigid block 116 supported on the earth supporting plate 63. The lower end of the shaft 110 is rotatably journaled in a suitable bearing 118 in the dirt supporting plate 63.

Between the bearings 118 and 114, a crank arm 120 is keyed to the shaft 110 at one of its ends, and is pivotally connected at its other end to an upwardly projecting stud 122 which is secured to the upper surface of the uppermost horizontally extending slide plate 82 of the blade assembly 80. The stud 122 passes through and moves in an elongated slot 124 formed in the crank arm 120 so that the oscillating motion of the crank arm 120 is translated into reciprocating or rectilinear motion of the blade assembly 80.

It will be noted in referring to FIGURES 2, 3 and 5 that the main transverse support plate 72 terminates at a point which corresponds with the junction between the downwardly inclined trailing portion 64 of the dirt supporting plate 63 with the horizontal leading portion 66 of the dirt supporting plate. There is thus defined between the main transverse support plate 72, the downwardly inclined rear portion 64 of the earth supporting plate 63 and the side plates 73, a downwardly opening chemical distribution chamber 130. The chemical distribution chamber 130 thus extends completely across the transverse width of the chemical distribution apparatus 18 at the rear end thereof, and functions to receive and distribute evenly over the exposed surface of the earth after the top layer thereof has been removed, a chemical of a selected type as hereinafter described.

Supported on the rear end of the main transverse support plate 72 and extending transversely across the chemical distribution chamber 130 is an elongated chemical distribution pipe 132. The chemical distribution pipe is provided with a plurality of rearwardly opening orifices 134 which eject chemicals into distribution nozzles 136 which are also provided with selectively dimensioned orifices. A suitable chemical feed conduit 140 is extended from a chemical storage reservoir 142 mounted on the framework 18 in the position illustrated in FIGURE 1, to the elongated chemical distribution pipe 132, for the purpose of continuously supplying a chemical thereto for distribution into the chemical distribution chamber 130. A chemical return conduit 141 extends from the chemical distribution pipe 132 back to the chemical storage reservoir 142. The chemical feed and return conduits 140 and 141 are extended downwardly inside the transmission housing 74 toward the rear end thereof, and are passed through suitable openings in the earth supporting plate 63 and the main transverse support plate 72 for connection to the chemical distribution pipe 132.

Operation

At the outset of the operation of the chemical distribution aparatus of the present invention, in the preferred mode of using the apparatus as illustrated in FIGURE 1, the chemical distribution apparatus 12 is connected behind a tractor 10 or other suitable self-propelled vehicle. The connection is established by connecting the hitch brackets 28 and 32 on the framework 20 to the three point hitch links 34 and 38 extending from the tractor 10. The outer hitch links 34 are rigidly connected to the framework through the hitch brackets 28 and are used to bodily raise and lower the framework relative to the ground. The central hitch link 28 is used to pivot the framework 20 about a horizontal axis for inclining the earth cutting portion of the apparatus relative to the ground preparatory to commencement of an excavating operation. After connecting the chemical distribution apparatus to the tractor 10 by a three point hitch connection, the input drive shaft 16 is connected to the power takeoff 12 through a suitable coupling 14.

In order to adjust the depth at which the earth cutting portion of the apparatus will operate and the thickness of the surface layer of earth removed, the ground engaging wheels 46 and 48 are adjusted in their vertical position relative to the framework 20 and relative to the blade assembly 80. This can conveniently be accomplished by use of the piston and cylinder assembly 52 and the insertion of the pin 59 in the apertures of the plates 60 and 61 to adjust the wheels to the specifically selected position. It will be noted in referring to FIGURE 1 that the distance which separates the ground engaging surfaces of the wheels 46 and 48 from the cutting edges of the blades 90 define the distance below the surface of the ground which the cutting apparatus will operate.

With the apparatus thus connected and the ground engaging wheels so positioned, the central hitch link 38 may be shortened by actuating mechanism (not shown) on the tractor 10 to cause the framework to be inclined downwardly at a slight angle with respect to the ground. The tractor is then started and is moved forward with the result that the blades 90 bite into the earth and seek a level beneath the surface of the earth shown in FIGURE 1. Upon attaining this level, the blade assembly 80 and the framework 20 will tend to level out to a horizontal plane as a result of the movement of the central hitch link 38 as a radius which will cause it to extend farthest to the rear when it is in the horizontal position shown in FIGURE 1.

Simultaneously, with the commencement of forward movement of the tractor 10, the power takeoff 12 is energized and drives the input drive shaft 16 through the connecting coupling 14. The power input shaft 16 in turn causes the eccentrically mounted cam plate 100 to rotate inside the annular bearing plate 102 with the result that the annular bearing plate undergoes an oscillating movement and causes the rods 104 and 106 to undergo reciprocation or rectilinear motion at their outer ends. This motion is in turn transmitted through the crank links 107 to the crank arms 108 which cause oscillatory motion of the shafts 110. The motion of the shafts 110 is transmitted through the crank arms 120 to the blade assembly 80 which is caused to reciprocate transversely with respect to the direction of movement of the tractor 10 and the chemical distribution apparatus 88.

Relative to the motion of the blade assembly 80 and the blades 90 which are carried thereby, it will be noted that this motion is, in actuality, a compound motion in that the tractor 10 is moving the chemical distribution 18 along the ground, and, at the same time, the blade assembly 80 is reciprocating in a transverse direction. The blades 90 thus are driven forwardly into the soil and, at the same time, cut in a sidewise fashion so that any roots which may penetrate the earth are severed by the sharpened edges 90a of the blades 90. The rate of penetration into the earth is considerably increased by this motion of the blade assembly 80.

As the blades 90 slice through the earth, the layer of earth which is removed thereby moves to the rear of the chemical distribution apparatus over the uppermost slide plate 82 and over the dirt supporting plate 63. The earth is spread or divided with a minimum of resistance by the leading portions 74a of the transmission housings 74 so as to pass clear of the housings in its rearward movement. The transmission housings 74 protect the moving parts of the power transmission system from the dirt and it is preferable to seal the lower edges of the leading portion 74a of the transmission housings with a small amount of compressed air or a good friction seal.

As the dirt continues to move to the rear of the chemical distribution apparatus 18, it passes over the downwardly inclined rear portion 64 of the dirt support plate 63 and then comes to rest on top of the earth from which it has been removed.

A chemical which it is desired to distribute evenly beneath the removed layer of earth is supplied from the chemical storage reservoir 142 to the chemical distribution pipe 132 which extends transversely across the chemical distribution chamber 130. In the case of liquids, the liquids are atomized or converted to a spray by the nozzles 136 which project outwardly from the chemical distribution pipe 132 so that the spray completely fills the chamber 130 and settles in a layer on the earth therebelow. A slightly different form of the invention from that illustrated will be used in those instances where it is desired to distribute a powder or pellets in the chemical distribution chamber 130.

It will be noted that because of the displacement of the blade assembly 80 and the dirt supporting plate 63 below the surface of the earth, a complete seal is formed around the chemical distribution chamber 130 as the apparatus moves through the earth. There is thus no opportunity for the chemical, even if in gaseous form, to escape to the surrounding atmosphere with possible danger to operating personnel or deleterious effects on surrounding plant and animal life.

From the foregoing description of the invention, it will be appreciated that the present invention provides an improved method for uniformly distributing a chemical at a selected depth beneath the surface of the earth. The mechanism is sturdily constructed and is characterized by a long and trouble-free operating life.

Although certain preferred embodiments have been herinbefore illustrated in order to provide an example to those skilled in the art and desiring to practice the invention, it is to be understood that numerous equivalent structures can be devised which do not relinquish the utilization of the basic principles which underlie the invention. For example, an engine or other source of power for driving the blade assembly 80 in its reciprocating transverse movement can be mounted on the framework 20 of the chemical distribution apparatus 18, rather than such actuation being developed from the tractor 10. Also, various other ways of defining the chemical distribution chamber may be devised, and the blade assembly 80 may be caused to operate with a compound motion by the inclusion of a cam surface behind the rollers 92. The blades themselves in such assembly can be changed in shape to accomplish different purposes, according to the consistency and nature of the soil in which the machine is to operate. In view of the possibilities of such variations in structure, it is to be understood, and it is intended that the foregoing description and the drawings which accompany this application are intended by way of example only, and are not considered to be comprehensive of all forms which the invention may assume. All such modifications and departures as may be made in the structure without departure from the basic principles of the invention as herein enunciated are deemed to be circumscribed by the spirit and scope of the invention except as the same may be necessarily limited by the appended claims or reasonable equivalents thereof.

I claim:

1. Apparatus for distributing chemicals beneath the surface of the earth comprising:
   a main transverse horizontal support plate having a forward edge, a trailing edge and two opposed ends extending perpendicular to said forward and trailing edges;
   a generally horizontally extending dirt supporting plate mounted on said main transverse support plate and extending in part to the rear thereof;
   a pair of spaced side plates secured to the opposite ends of said main transverse support plate and defining with said dirt supporting plate, a downwardly opening chemical distribution chamber positioned to the rear of said main transverse support plate;
   means for evenly distributing a chemical into all parts of said downwardly opening chemical distribution chamber;
   earth cutting means movably mounted on the forward edge of said main transverse horizontal support plate for cutting movement in a horizontal plane; and
   power means for moving said apparatus along the ground and for moving said earth cutting means on said main transverse horizontal support plate.

2. Apparatus as claimed in claim 1 wherein said dirt supporting plate has a pair of opposed side edges and is provided with a horizontal forward portion secured to a portion of the upper surface of said main transverse horizontal support plate, and a downwardly inclined rear portion extending to the rear of said main transverse support plate; and
   wherein said side plates are generally vertically extending plates extending to the rear of said main transverse support plate and are conterminous with the downwardly inclined rear portion of said dirt supporting plate and are secured at their upper edges to the side edges of said dirt supporting plate.

3. Apparatus as claimed in claim 2 wherein said earth cutting means is characterized in having a generally horizontally extending upper surface, said horizontally extending upper surface extending in substantially coplanar relation to the upper surface of the horizontal forward portion of said dirt supporting plate whereby dirt can move from said earth cutting means to said dirt supporting plate with a minimum of resistance.

4. Apparatus as claimed in claim 1 wherein said means for evenly ejecting a chemical comprises a chemical distribution conduit extending across said chemical distribution chamber and having a plurality of orifices therein; and a chemical reservoir for supplying a chemical to said chemical distribution conduit.

5. Apparatus as claimed in claim 1 wherein said earth cutting means comprises:
   sliding plate means slidably mounted on said main transverse horizontal plate for reciprocating movement on the forward edge thereof; and
   blade means mounted on said sliding plate means and movable therewith for slicing into the earth in a substantially horizontal plane.

6. Apparatus as claimed in claim 5 wherein said sliding plate means comprises a pair of vertically spaced, horizontally extending slide plates disposed above and below said main transverse support plate and slidably keyed thereto; and wherein said blade means includes a plurality of blades positioned in side-by-side relation between said slide plates and secured to said slide plates for movement therewith.

7. Apparatus as claimed in claim 6 wherein said blades each have a pair of sharpened sides converging to a point and a shank portion spaced from said point and secured between said slide plates.

8. Apparatus as claimed in claim 6 wherein said main transverse support plate is provided with elongated keyways in the upper and lower surfaces thereof and extending parallel to the forward edge thereof; and wherein said slide plates each include elongated keying projections extending into said keyways; said sliding plate means being further characterized to include a plurality of roller bearings mounted between said horizontally extending slide plates and bearing against the forward edge of said main transverse support plate.

9. Apparatus as claimed in claim 1 wherein said power means comprises:
   a self-powered vehicle having a power takeoff thereon; and
   power transmission means connected between said power takeoff and said earth cutting means.

10. Apparatus as claimed in claim 9 wherein said power transmission means includes:
    a power input shaft connected to the power takeoff of said self-propelled vehicle;
    a cam plate eccentrically keyed to said power input shaft;
    an annular bearing plate rotatably mounted on said cam plate;
    horizontally extending rods pivotally connected at one of their ends to opposite sides of said annular bearing plate;
    vertically extending shafts rigidly secured at one of their ends to the opposite ends of said horizontally extending rods; and
    crank arms rigidly connected to each of said shafts and pivotally and slidably connected to said earth cutting means for moving said earth cutting means in rectilinear motion on said main transverse horizontal support plate.

11. Apparatus as claimed in claim 10 and further characterized to include:
    a framework mounted on, and spaced vertically from, said main transverse frame;
    hitch means detachably connecting said framework to said self-powered vehicle;
    means on said framework supporting and enclosing said cam plate and annular bearing plate; and
    transmission housing extending between said framework and said main transverse support plate for supporting said frame on said transverse support plate and for enclosing and protecting said vertically extending shafts and crank arms.

12. Apparatus as claimed in claim 11 and further characterized to include:
    ground engaging wheels pivotally supported on said framework; and
    means for adjustably positioning said ground engaging wheels at selected positions above and below the vertical level of said main transverse support plate.

13. Apparatus as claimed in claim 1 and further characterized to include:
    a framework mounted on, and spaced vertically from, said main transverse support plate;
    means on said framework for hitching the framework to a tractor vehicle at three points of support; and
    a chemical reservoir mounted on said framework and connected to said chemical distributing means for supplying a chemical thereto.

14. An earth excavating machine adapted for evenly distributing chemicals beneath the earth comprising:
   a generally horizontally extending framework;
   a generally horizontally extending dirt supporting plate spaced vertically below said framework;
   vertically extending interconnecting means interconnecting said framework and dirt supporting plate;
   plate means defining, with said dirt supporting plate, a downwardly opening chemical distribution chamber;
   earth cutting means movably mounted in said excavating machine on one side of, and in juxtaposition to, said dirt supporting plate and movable relative thereto in a horizontal plane; and
   power means for moving said framework, dirt supporting plate and earth cutting means in one direction relative to the earth and simultaneously moving said earth cutting means in a direction normal to said one direction of movement.

15. Apparatus as claimed in claim 14 wherein said means defining a downwardly opening chemical distribution chamber with said dirt supporting plate comprises:
   a main transverse support plate positioned beneath and secured to a forward portion of said dirt supporting plate, said main transverse support plate having opposite ends conterminous with the side edges of said dirt supporting plate; and
   a pair of vertically extending side plates secured to opposite ends of said main transverse support plate and to the side edges of said dirt supporting plate.

16. Apparatus as claimed in claim 14 wherein said power means comprises:
   a self-powered vehicle connected to said framework; and
   power transmission means connected between said self-powered vehicle and said earth cutting means for moving said earth cutting means in a horizontal plane and relative to said dirt supporting plate.

17. Apparatus as claimed in claim 14 wherein said earth cutting means and said dirt supporting plate are disposed at substantially the same vertical level whereby earth excavated by said earth cutting means can move onto said dirt supporting plate with a minimum of resistance.

18. Apparatus as claimed in claim 14 and further characterized to include ground engaging wheels adjustably mounted on said framework and movable between a first position in which said wheels have their lower ground engaging surface disposed below said generally horizontally extending dirt supporting plate, and a second position in which said wheels have their lower, ground engaging surface disposed in a horizontal plane above the horizontal plane of said dirt supporting plate.

19. Apparatus for slicing away a layer of earth and depositing a chemical thereunder comprising:
   at least one horizontally reciprocating blade adapted to cut through the earth in a horizontal plane;
   means connected to said blade for adjusting the depth at which said blade cuts into the earth;
   dirt supporting means positioned adjacent said blade for receiving a layer of earth sliced away by said blade;
   means defining with said dirt supporting means a downwardly opening chamber below said dirt supporting means to facilitate distributing a chemical on the earth surface exposed after removal of said layer; and
   power means for moving said apparatus along the ground and simultaneously reciprocating said blade.

References Cited by the Examiner
UNITED STATES PATENTS

| | | | |
|---|---|---|---|
| 1,571,481 | 2/1926 | Dasmeier. | |
| 1,777,391 | 10/1930 | Brewer | 47—1.42 |
| 2,237,775 | 4/1941 | Wood et al. | 47—1.42 |
| 2,563,926 | 8/1951 | Elliot et al. | 47—1.42 |
| 2,950,566 | 8/1960 | Henry | 47—1.42 |
| 2,986,841 | 6/1961 | MacDonald | 47—1.42 |

ABRAHAM G. STONE, *Primary Examiner.*

R. E. BAGWILL, *Assistant Examiner.*